United States Patent
Arguello

(10) Patent No.: US 7,595,568 B2
(45) Date of Patent: Sep. 29, 2009

(54) IGNITION SYSTEM FOR A GAS TURBINE ENGINE

(75) Inventor: Gustavo Arguello, Dallgow-Doeberitz (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 454 days.

(21) Appl. No.: 11/706,967

(22) Filed: Feb. 16, 2007

(65) Prior Publication Data
US 2007/0200352 A1  Aug. 30, 2007

(30) Foreign Application Priority Data
Feb. 17, 2006  (DE) .................. 10 2006 007 832

(51) Int. Cl.
*H02J 9/00* (2006.01)
*H02J 3/38* (2006.01)
*F23Q 3/00* (2006.01)
(52) U.S. Cl. ............................ 307/64; 307/23; 361/253
(58) Field of Classification Search .................. 307/64, 307/23; 361/253
See application file for complete search history.

(56) References Cited

U.S. PATENT DOCUMENTS

| 6,195,247 | B1 | 2/2001 | Cote |
| 6,344,700 | B1 | 2/2002 | Eisenhauer |
| 2003/0067284 | A1* | 4/2003 | Costello ............. 322/59 |

FOREIGN PATENT DOCUMENTS

DE  44 34 705 C2  1/1997

* cited by examiner

*Primary Examiner*—Fritz M Fleming
*Assistant Examiner*—Dru M Parries
(74) *Attorney, Agent, or Firm*—Timothy J. Klima; Shuttleworth & Ingersoll, PLC

(57) ABSTRACT

In the case of an ignition system for a gas turbine engine, the power (P1, P2) intended for the two ignition units (1, 2) is supplied via a power supply bus (10, 14) each comprising a standard bus (11, 11'; 15, 15') and an emergency bus (12, 12'; 16, 16'), and a relay (13, 17) connected to the respective power supply line to the corresponding ignition unit. In the event of failure of power supply in a supply line for power P1 or P2, the corresponding relay will automatically (mechanically) switch over to the respective other power supply line, thus ensuring that the function of the ignition unit is maintained, even if—for whatever reasons—power supply to one or the other ignition unit is interrupted.

11 Claims, 1 Drawing Sheet

IGNITION SYSTEM FOR A GAS TURBINE ENGINE

Figure 1:
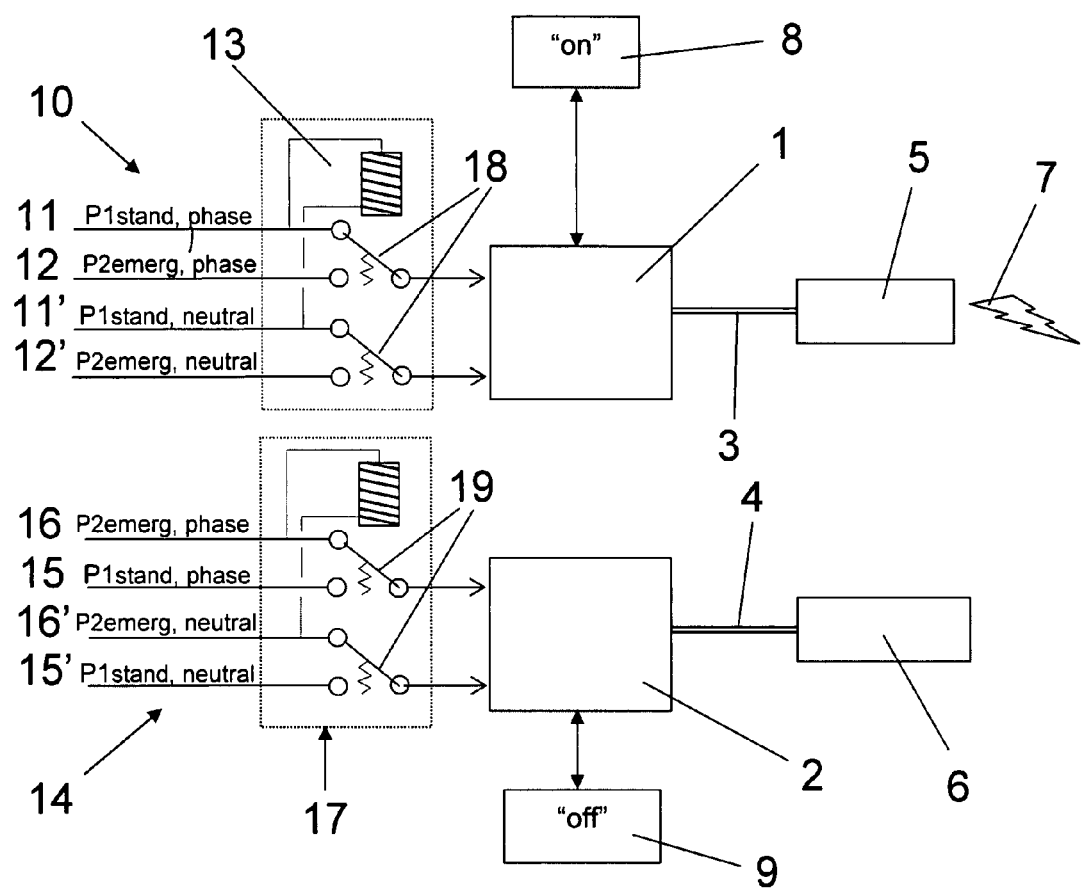

This application claims priority to German Patent Application DE 10 2006 007 832.2 filed Feb. 17, 2006, the entirety of which is incorporated by reference herein.

BACKGROUND OF THE INVENTION

This invention relates to an ignition system for a gas turbine engine, with each of the first and second ignition units being connected to first and second igniters and to a first and second power supply bus and a first and second control unit for the activation of power supply.

Ignition systems of the type specified above for the ignition of fuel fed to the combustion chamber of a gas turbine engine during engine start are generally known. While a single ignition unit and a single igniter would in principle be sufficient for starting, a combined system of two ignition units supplied with direct and alternating current from the aircraft and each connected to an igniter is installed for safety reasons and to satisfy all operating conditions, for example continuous ignition during extremely high humidity or re-start of an engine failed in service. Similarly, two control units are provided for electronic engine control, with each of the two electronic engine control units being connected to both ignition units to signal power supply from both control units to the ignition units, thus triggering the generation of the ignition voltage required for the ignition process. One power supply bus each is connected to the respective ignition unit for the provision of energy (P1 or P2, respectively).

The above described combined ignition system consisting of two ignition units and two igniters does, however, not operate with sufficient safety if power supply via the one or the other power supply bus to the respective ignition unit is not ensured for any reason.

DESCRIPTION OF THE INVENTION

In a broad aspect, the present invention provides, with simple means, for an ignition system of the type specified above which ensures operation of the respective ignition unit, and thus the entire ignition system, even if one of the two power supplies fails.

It is a particular object of the present invention to provide solution to the above problems by an ignition system designed in accordance with the features described below.

In other words, the present invention provides, in its essence, for the supply of power P1 and P2 intended for each ignition unit to the respective ignition unit via a power supply bus comprising a standard bus and an emergency bus each and a relay electrically connected to the power supply line. In the event of failure of power supply P1 to a (first) ignition coil, the relay so far energized from the standard bus will be dead and, in consequence, a mechanical (automatic) switchover will be made to the emergency bus not connected to the relay, thus enabling the respective ignition unit to be supplied with power P2 intended for the other (second) ignition coil. In an analogous arrangement, the other (second) ignition coil will usually be supplied with power P2 and, in the event of a failure of the corresponding power supply line for power P2, an automatic switchover will be made to the power supply line for power P1 by means of a relay.

Thus, the present invention ensures, with simple technical means, that the required power supply is immediately restored if a failure, even a failure of a relay, occurs in the respective power supply line to the ignition unit affected since an automatic (mechanical) switchover to the other power supply is made also in this case. Upon switchover to the respective other power supply, the control unit affected can, in addition, receive a signal informing of a failure in the power supply line or the relay.

Advantageous embodiments of the present invention will become apparent from the sub-claims.

FIG. 1 shows a block diagram of an ignition system for a gas turbine engine (which is an example of the present invention) by which power to one of the two ignition units is ensured even if one of the power supplies should fail.

According to the block diagram, the ignition system comprises two first and second ignition units 1 and 2 which are connected, via first and second ignition leads 3 and 4, to first and second igniters 5 and 6 arranged in the combustion chamber of a gas turbine engine. For the generation of the ignition spark 7, an alternating current of 115 V, for example, is applied to the ignition units 1 and 2 in the present example. Energy supply is, however, activated by an "on" signal from one of the two control units 8 and 9 of the gas turbine engine, with the ignition unit 1 being allocated to the first control unit 8 and the ignition unit 2 to the second control unit 9 of the engine, and in the present case, the ignition unit 1 receiving the "on" command for energy supply from the first control unit 8.

The energy P1 and P2 required for the generation of the ignition spark 7 at one of the igniters 5 or 6, here the igniter 5, is supplied to each ignition unit 1 and 2 via a first power supply bus 10 which comprises a first standard bus 11, 11' ($P1_{standard, phase}$, $P2_{standard, neutral}$) and a first emergency bus 12, 12' ($P2_{emergency, phase}$, $P2_{emergency}$) and a first electromechanical relay 13 allocated to these busses as well as a second power supply bus 14 which comprises a second standard bus 15, 15' and a second emergency bus 16, 16'—however in mirrored arrangement as compared to the first standard and emergency bus—and a second electromechanical relay 17 allocated to these busses. The first relay 13 is electrically connected to the first standard bus 11, 11' for supply of power P1, while the second relay 17 is electrically connected to the second emergency bus 16, 16' for supply of power P2.

The individual lines (phase and neutral) of the standard bus 11, 11'; 15, 15' and the emergency bus 12, 12'; 16, 16' are alternately arranged in the power supply bus and connected each via the corresponding relay 13 or 17, respectively. In the present embodiment, the two relays 13 and 17 are arranged ahead of the two ignition units 1 and 2 in the form of a supplementary box. The relays can, however, also be integrated into the respective ignition unit 1, 2 or the respective control unit 8, 9.

As shown in the drawing, the first ignition unit 1 receives an "on" signal from the first control unit 8 for power supply (P1) via the standard bus 11, 11' and the first relay 13 to ultimately produce the ignition spark(s) 7 at the igniter 5. If power supply P1 via the standard bus 11, 11' is interrupted due to a failure, relay 13 will be de-energized, and its spring-loaded switches 18 will automatically connect the first ignition unit 1 to the emergency bus 12, 12' (phase and neutral) to supply power P2 now. Analogically, upon a corresponding "on" command, power supply would also be effected to the second ignition unit 2 which is supplied with energy P2 via the second emergency bus 16, 16' in the power supply bus 14. Should supply with energy P2 via this emergency bus 16, 16' fail, the spring-loaded switches 19 of the second relay 17, now released by the relay, will be mechanically set to the connections (phase and neutral) of the standard bus 15, 15' responsible for the supply of energy P1.

This ensures that power supply is maintained to the ignition coil even if a failure occurs in its power supply line.

LIST OF REFERENCE NUMERALS

1 First ignition unit
2 Second ignition unit
3 First ignition lead
4 Second ignition lead
5 First igniter
6 Second igniter
7 Ignition spark
8 First control unit
9 Second control unit
10 First power supply bus
11, 11' First standard bus (P1standard)
12, 12' First emergency bus (P2emergency)
13 First relay
14 Second power supply bus
15, 15' Second standard bus (P1standard)
16, 16' Second emergency bus (P2emergency)
17 Second relay
18 Spring-loaded switches of first relay 13
19 Spring-loaded switches of second relay 17

What is claimed is:

1. An ignition system for a gas turbine engine, comprising:
first and second ignition units;
first and second igniters;
first and second power supply busses for power (P1, P2);
first and second control units for activation of the power supplies:
wherein the first and second ignition units are connected respectively, to the first and second igniters, the first and second power supply busses for power (P1, P2), and the first and second control units
each power supply bus comprising a standard bus for power P1 and an emergency bus for power P2 and a relay, which in normal operation of the first power supply bus is electrically connected to the standard bus for power P1 and in normal operation of the second power supply bus is electrically connected to the emergency bus for power P2, and, wherein, in the event of a power supply failure, the respective relay makes an automatic switchover to the respective other power supply of the corresponding power supply bus.

2. An ignition system in accordance with claim 1, wherein the relays are arranged ahead of the ignition units.

3. An ignition system in accordance with claim 2, wherein individual lines of the standard bus and of the emergency bus are alternately arranged in the power supply bus.

4. An ignition system in accordance with claim 3, wherein the standard bus and the emergency bus in the second power supply bus are in mirrored arrangement as compared to the standard bus and the emergency bus in the first power supply bus.

5. An ignition system in accordance with claim 4, wherein the switchover is mechanically operated due to a deenergization of the respective relay.

6. An ignition system in accordance with claim 1, wherein the relays are respectively integrated into one of the ignition units or the control units.

7. An ignition system in accordance with claim 1, wherein individual lines of the standard bus and of the emergency bus are alternately arranged in the power supply bus.

8. An ignition system in accordance with claim 7, wherein the standard bus and the emergency bus in the second power supply bus are in mirrored arrangement as compared to the standard bus and the emergency bus in the first power supply bus.

9. An ignition system in accordance with claim 8, wherein the switchover is mechanically operated due to a deenergization of the respective relay.

10. An ignition system in accordance with claim 1, wherein the standard bus and the emergency bus in the second power supply bus are in mirrored arrangement as compared to the standard bus and the emergency bus in the first power supply bus.

11. An ignition system in accordance with claim 1, wherein the switchover is mechanically operated due to a deenergization of the respective relay.

* * * * *